United States Patent [19]

Fabrizi et al.

[11] Patent Number: 4,825,096
[45] Date of Patent: Apr. 25, 1989

[54] REMOTE CONTROL APPARATUS FOR TRIPPING OFF SWITCHES

[75] Inventors: Fabrizio Fabrizi, Bergamo; Ennio Calderara, Cuasso Al Piano, both of Italy

[73] Assignee: Bassani Ticino S.p.A., Milan, Italy

[21] Appl. No.: 148,769

[22] Filed: Jan. 26, 1988

[30] Foreign Application Priority Data

Feb. 9, 1987 [IT] Italy ................. 19298 A/87

[51] Int. Cl.⁴ .................... H01H 47/22; H01H 75/00
[52] U.S. Cl. .................. 307/112; 307/114; 335/6; 335/13; 335/14
[58] Field of Search .............. 307/112, 114; 335/2–10, 13, 14, 16, 20, 21, 26, 38, 41, 42, 44, 71, 72, 136, 137, 147, 148, 150, 172, 169, 189, 191, 192, 195, 166, 132, 190, 201; 361/103, 102, 111, 114, 115, 116, 191, 160

[56] References Cited

U.S. PATENT DOCUMENTS

| | | | |
|---|---|---|---|
| 3,388,358 | 6/1968 | Paganelli | 335/201 X |
| 3,860,910 | 1/1975 | Hudson | 307/114 |
| 4,164,719 | 8/1979 | Young et al. | 335/14 |
| 4,308,511 | 12/1981 | Borona | 335/14 |
| 4,367,510 | 1/1983 | Watanabe | 307/114 X |
| 4,529,951 | 7/1985 | Youichi et al. | 335/13 |
| 4,604,596 | 8/1986 | Yokoyama et al. | 335/6 X |
| 4,636,760 | 1/1987 | Lee | 335/6 X |
| 4,682,132 | 7/1987 | Belbel et al. | 335/6 X |
| 4,700,160 | 10/1987 | Belbel et al. | 335/14 |
| 4,703,294 | 10/1987 | Yokoyama et al. | 335/6 X |
| 4,725,799 | 2/1988 | Bratkowski et al. | 335/6 X |

Primary Examiner—William M. Shoop, Jr.
Assistant Examiner—Paul Ip
Attorney, Agent, or Firm—Hedman, Gibson, Costigan & Hoare

[57] ABSTRACT

An apparatus with remote control features for tripping off magnetothermal switches comprises at least one switch having a central core supporting trip-off linkages wherein a voltmeter coil is housed with each switch being connected to a respective one, e.g. a lamp, of user electric appliances.

The apparatus also comprises a pushbutton control connected to each voltmeter coil in each magnetothermal switch for remotely and simultaneously operating the trip-off linkages to thus turn off simultaneously each electric appliance, while enabling function regaining by operating the corresponding switch locally.

8 Claims, 5 Drawing Sheets

REMOTE CONTROL APPARATUS FOR TRIPPING OFF SWITCHES

DESCRIPTION

This invention relates to a remote control apparatus for tripping off switches, of a type which comprises at least one of said switches, having a central core supporting trip-off linkages, and at least one input terminal and one output terminal respectively associated with a fixed contact and a moving contact, with said switch connected and acting on a respective one of user electric appliances.

As is known, switches of the kind referred to above are usually housed, as the so-called working cores, in flush mounted boxes of civil range electric appliances. Further, such switches are particularly, though not solely, used for turning on/off a light in an office or a dwelling space, and reference will be made in the ensuring description to such an application merely for simplicity of illustration.

This invention fills a demand for an ability to turn off in a simultaneous and centralized manner plural user electric appliances, such as lights left on in a dwelling or in various offices of a working site.

That ability is especially useful on the employees leaving their place, or to save on power where the ambient illumination provided by nature light proves adequate.

To meet such requirements, the prior art proposes two different approaches. A first approach consists of operating a power cut-out switch to put off all the lights.

However, this approach has the serious drawback that it denies restoration of a light function by a possible user operating a nearbly switch. Also, there are certain electric appliances which are to be kept alive on a continuous basis.

A second prior approach, currently employed in industrial environments, consists of providing a lighting system comprising a set of cascade connected so-called sectional switches. In other words, a group of switches are provided which fit generally in a common panel and are each connected to a respective light which may be located in remote areas from the switch panel.

Such a set of switches would be controlled by another switch placed upstream thereof, and so on to form power supply sections which are structurally independent of one another.

However, this second approach has some serious disadvantages, especially as regards cost, due to the increased requirement for electric cables, and operating convenience, due to the impossibility of regaining local control of a light, just like the first approach.

The problem underlying this invention is to provide a remote control apparatus for tripping off switches which has such constructional and operational features as to overcome the prior art drawbacks noted above.

The solutive idea underlying this invention is one of remotely operating the trip-off linkages of each switch while keeping the latter alive.

This problem is solved by an apparatus as indicated being characterized in that it comprises a voltmeter coil housed within the switch central core, operative on said trip-off linkages, and having one end connected electrically to said moving contact and the other end connected to said output terminal, a power supply circuit for said coil, as equipped with a pushbutton control for operating said trip-off linkages and being connected with said moving contact in said power supply circuit.

The inventive apparatus features and advantages will become apparent from the following detailed description of an exemplary embodiment, given by way of illustration and not of limitation with reference to the accompanying drawing figures.

Figure 1:
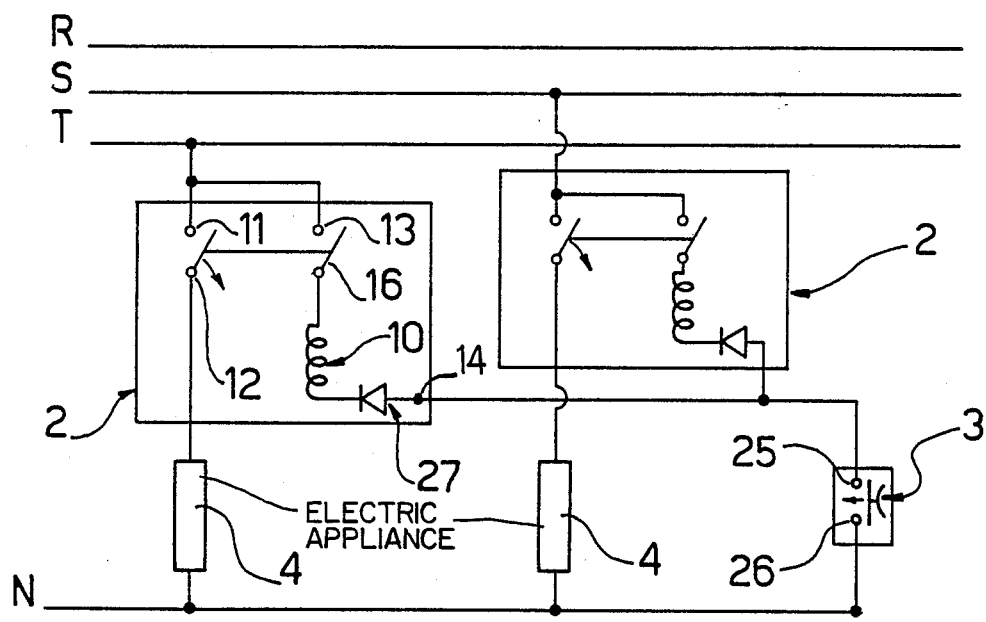
FIG. 1 shows a schematical view of a switch tripping apparatus according to the invention.
Figure 2:
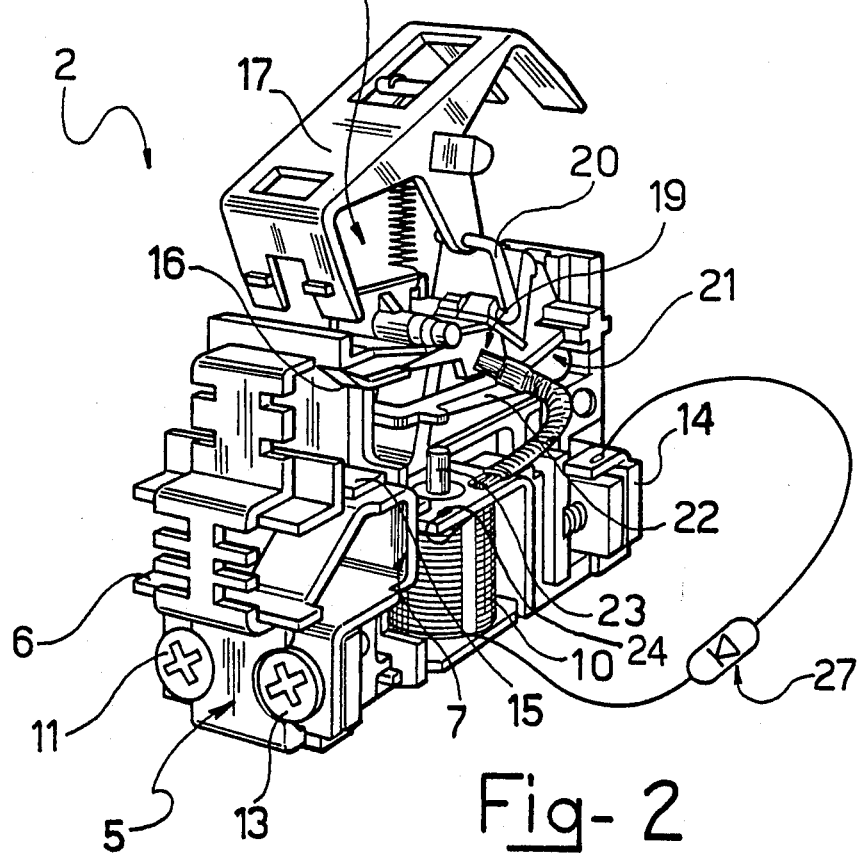
FIG. 2 shows a perspective view of a switch mounted on the apparatus of FIG. 1.

With reference to the drawing figures, and specifically to the embodiment shown in FIG. 1, the numeral 1 generally designates an apparatus for tripping off switches, indicated at 2, by means of a remote control 3.

The remote control 3 is a pushbutton type of control with an automatic spring bias, while the switches 2 are advantageously of the double-pole type with automatic magnetothermal protection.

The switches 2 are adapted for mounting within a small frame, not shown, for flush-mounted boxes of civil range electric appliances. Further, such switches 2 would be connected to operate a respective user electric appliance such as a lamp 4 for lighting a civil enclosure.

In the example of FIG. 1, each switch 2 is connected serially to a corresponding lamp 4 across a respective live conductor or phase R, S or T of a three-phase system, and a neutral conductor N.

The switch 2 comprises a central core 5 wherei a pole pair are accommodated, namely a protected pole 6 and a neutral pole 7. The protected pole 6 extends between an input terminal 11 and an output terminal 12. Provided along the pole 6 are a fixed contact 8 associated with the input terminal 11, and a moving contact 9 associated with the output terminal 12.

The neutral pole 7 extends between an input terminal 13 and an output terminal 14. Provided along the pole 7 are a fixed contact 15 associated with the input terminal 13, and a moving contact 16 associated with the output terminal 14.

The switch 2 futher comprises trip-off linkages, generally designated 18, which are supported on the central core 5.

The linkages 18 comprise a key 17 and a moving contact holder assembly 19. Between the key 17 and the moving contact holder assembly 19 there is provided a toggle mechanism, known per se, designated 20.

The trip-off linkages 18 also comprise a spring-loaded lever 21 for clamping the moving contact holder assembly 19 in the switch make position. The lever 21 has two lugs, of which thelug 22 on the terminals 13 ad 14 side is visible.

The central core 5 of the switch 2 also accomodates a voltmeter coil 10 of thin wire, at the neutral pole 7.

The voltmeter coil 10 has a respective pusher 23 adapted to become engaged with the lug 22 of the clamping lever 21 so as to release the moving contact holder assembly 19 and cause the switch to break on energizing the coil 10 electrically.

One end 24 of the coil 10 is connected to the aforesaid moving contact 16, whereas the other end of the coil is connected to the output terminal 14 via a diode 27.

One of the terminals of the pushbutton control 3, in particular the terminal 25, is connected to the output terminal 14, and the other terminal 26 of the pushbutton 3 is connected directly to the neutral conductor N. Thus, the moving contact 16 is connected in a power supply circuit 45 connecting the coil 10 serially with the pushbutton control 3.

Advantageously, the diode 27 is connected serially to the coil 10, inside the switch 2, to avoid keeping the coil 10 alive as the switch makes to power the lamp 4 electrically.

it may be appreciated that the pushbutton control 3 may be a programming device to enable turning off the lights at programmably set times of the day, or a so-called twilight device which becomes operative at a set evening time.

Figure 3:
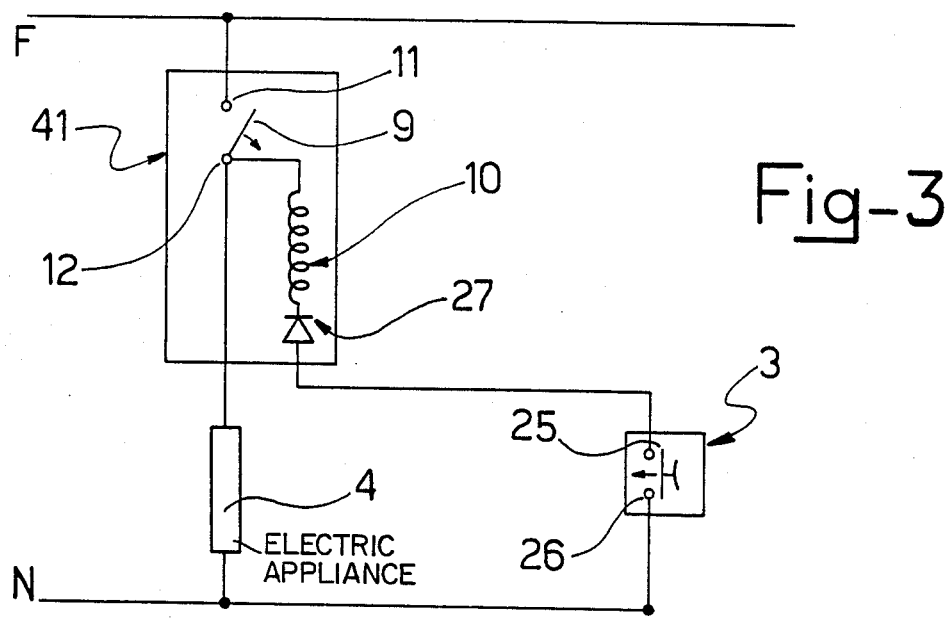
FIG. 3 shows a schematical view of a first embodiment of the inventive apparatus.
Figure 4:
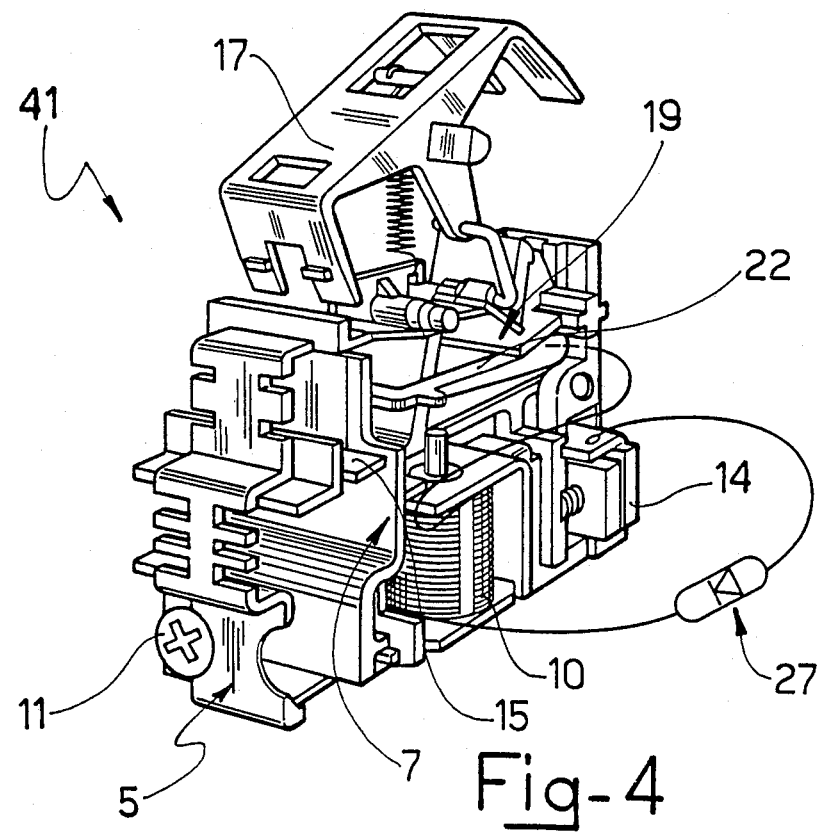
FIG. 4 shows a perspective view of a switch mounted on the apparatus of FIG. 3.

With reference to the embodiment shown in FIG. 3, a schematical view is shown therein of a first variation of the apparatus according to the invention. In this variation, items and cooperating parts which have the same construction and operate in the same way as the previously described embodiment are designated by the same reference numerals and no further explained herein.

Where the lamp 4 is powered off the mains in the so-called single-phase mode, it will be sufficient to provide the switch with just the protected pole 6. A switch of this kind, i.e. having no neutral pole 7, is denoted by the numeral 41, the end 24 of the coil 10 being connected therein to the output terminal 12 of the protected pole 6.

The diode 27 is connected serially to the coil 10 across the other end thereof and the output terminal 14. Connected to the terminal 14 is also the terminal 25 of the pushbutton control 3.

Figure 5:
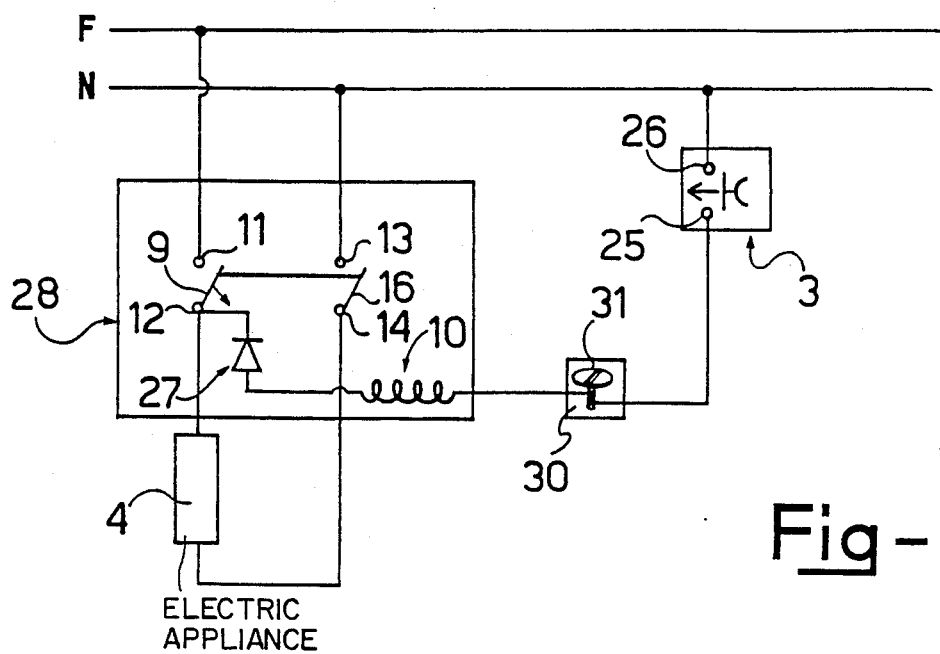
FIG. 5 shows a schematic view of a second embodiment of the inventive apparatus.
Figure 6:
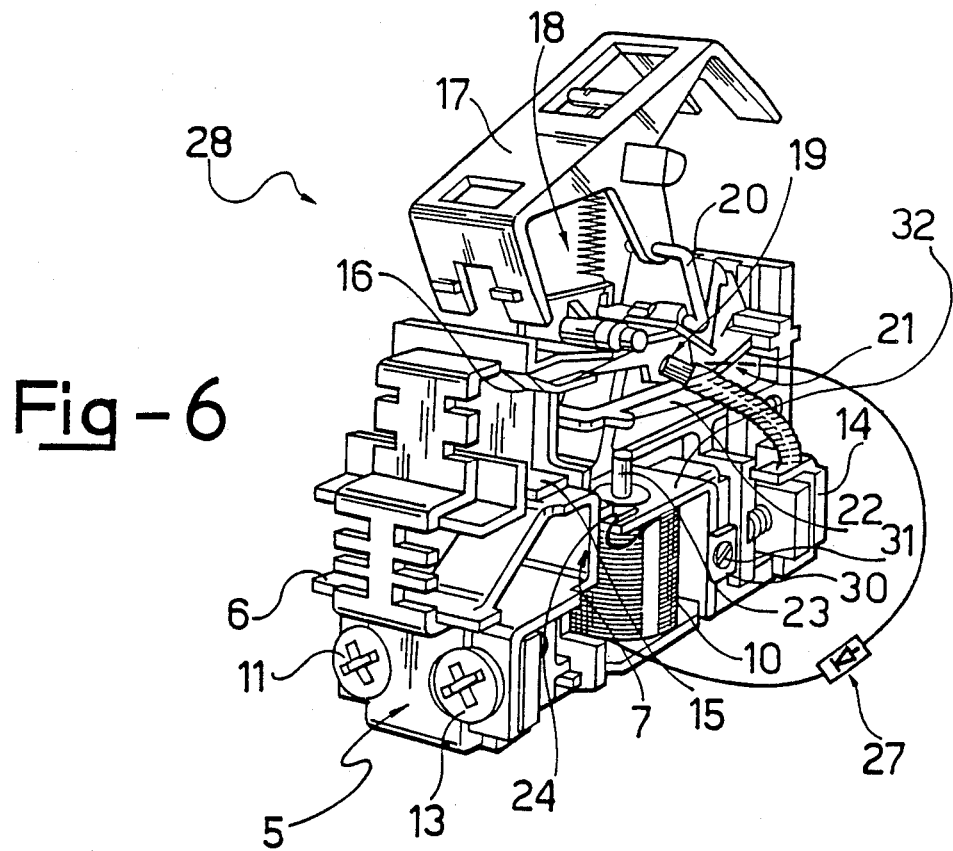
FIG. 6 shows a perspective view of a switch mounted on the apparatus of FIG. 5.

In another embodiment form, given with reference to FIG. 5, both poles, i.e. the protected pole 6 and neutral pole 7, from the switch are connected respectively across the phase line F and the lamp 4, and across the neutral conductor N and the lamp 4. This connection is referred to as single-plus-neutral pole.

In this embodiment, the output terminal 12 of the protected pole 6 is connected to one end of the diode 27 whose other end is connected to the coil 10. Advantageously, to complete the connection between the other end of the coil 10 and the terminal 25 of the pushbutton control 3, there is provided an additional terminal 30 attached laterally of the metal frame 32 carrying the coil 10 and provided with a cable clamp screw 31.

The end 24 of the coil 10 winding is connected to the aforesaid metal frame 32 to provide electric connectino to said terminal 30.

In a third embodiment of this invention, the voltmeter coil 10 of the switch 2 is connected in a safety low-tension supply circuit 48 supplying a 50V or lower voltage.

Figure 7:
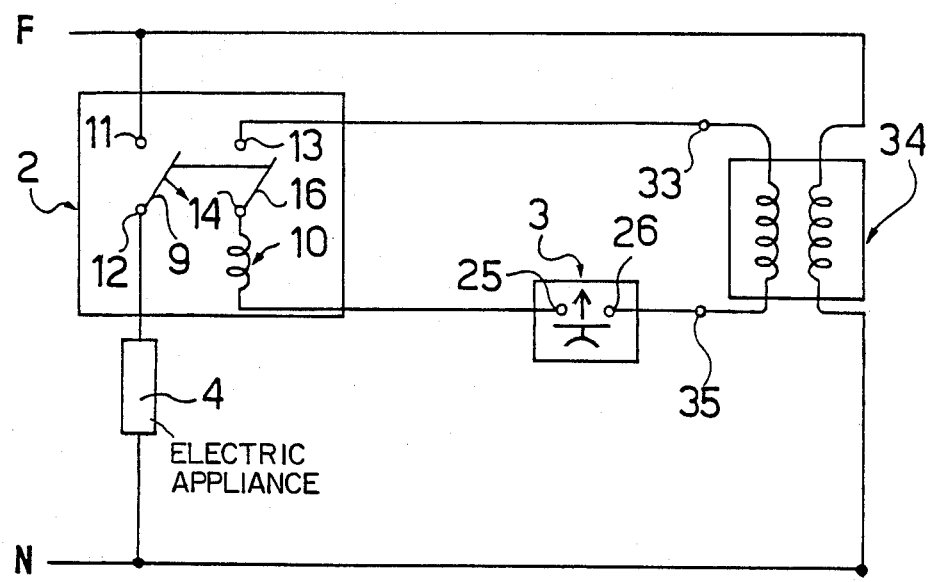
FIG. 7 shows a schematical view of a third embodiment of the inventive apparatus.
Figure 8:
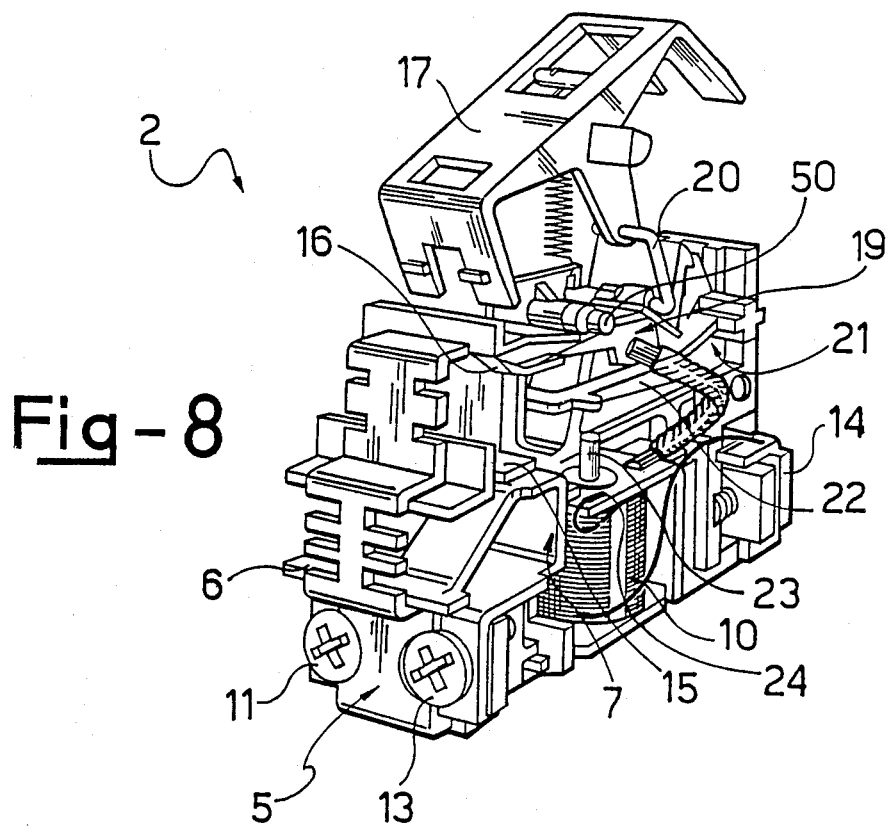
FIG. 8 shows a perspective view of a switch mounted on the apparatus of FIG. 7.

It may be take from FIG. 7 that the input terminal 13 of the neutral pole 7 is connected directly to an output terminal 33 from the secondary winding of a transformer 34 powered off the mains.

The secondary winding of the transformer 34 has its other output terminal 35 connected to the terminal 26 of the pushbutton 3. Since said power supply circuit 48 for the voltmeter coil 10 is structurally independent of the mains NF, the diode 27 is no longer required. Accordingly, the coil 10 will have its end 24 connected to the moving contact 16 and the opposite end connected directly to the output terminal 14 of the neutral pole 7. Thus, the moving contact 16 is connected in said power supply circuit 48.

Figure 9:
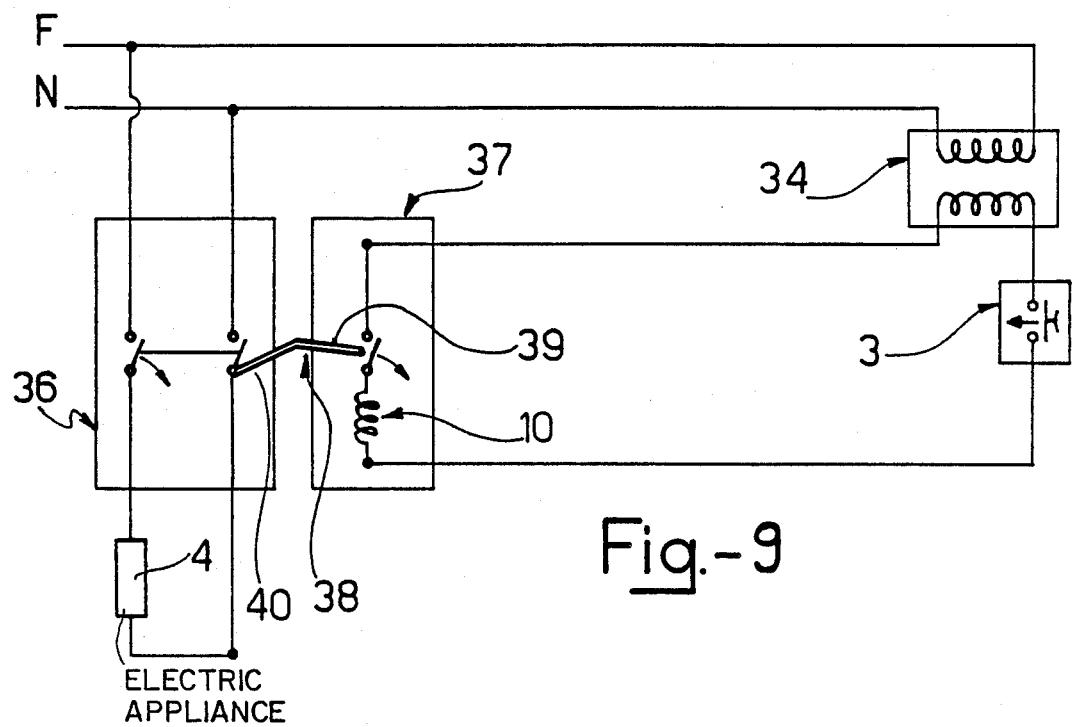
FIG. 9 shows a schematic view of a fourth embodiment of the inventive apparatus.
Figure 10:
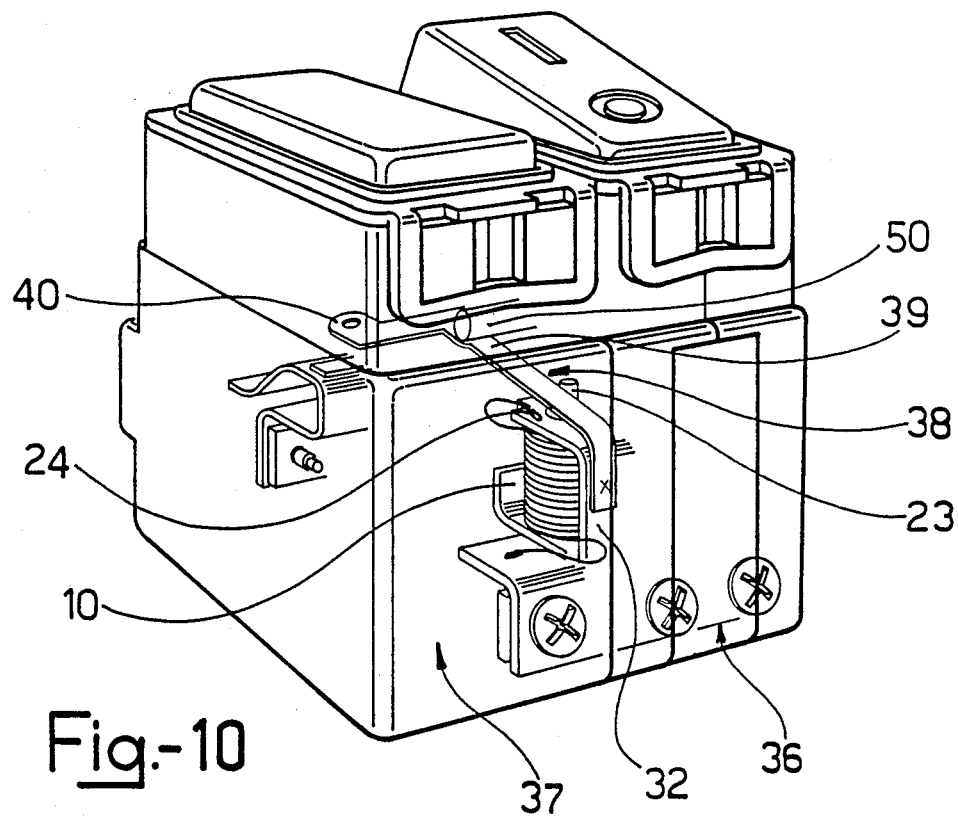
FIG. 10 shows a detail perspective view of a switch mounted on the apparatus of FIG. 9.

As a further variation of the invention, the approach illustrated in FIGS. 9 and 10 is proposed. Where one wishes to combine the advantages of the so-called single-plus-neutral pole connection between the switch 2 and lamp 4 with those afforded by independent safe voltage powering of coil 10, a pair of switches, 36 and 37, should be used.

The switch 36 has a design which includes the protected pole and neutral pole, with conventional trip-off linkages. The switch 37 also includes instead the voltmeter coil 10, which is connected to the secondary winding of the transformer 34 through a power supply circuit 52. Connected in said circuit 52 are the pushbutton control 3 and the moving contact 16 of the switch 37, like in the preceding embodiment.

The switch 36 is made rigid with the switch 37 to provide a single operating core in the civil range frame.

The switch 37 further contains a crank lever 38 functioning as the moving contact, which lever has a first arm 39 with one end attached to the frame 32 carrying the coil 10 of the switch 37; the arm 39 extends in a position overlying the coil 10.

A second arm 40 of the lever 38 extends perpendicularly to the first arm 39 toward the switch 36. In particular, the arm 39 is adapted to interfere with a lug 50 of the moving contact holder assembly 19 of the switch 37 when the pusher 23 of the coil 10 is operated by depressing the pushbutton 3. Furthermore, the arm 40 of the lever 38 is in turn operative on the linkages 18 of the switch 36. Thus, by operating the pushbutton control 3, and hence, energizing the coil 10 electrically, the moving contact holder assembly of each switch can be released to trip-off the switch.

The greatest advantage shared by all the embodiments of this invention described hereinabove is that the inventive apparatus affords the ability to turn off simultaneously and in a centralized manner a plurality of electric appliances, while still enabling local regaining of the functions of each individual appliance by operating its respective switch, which will be kept alive because only its trip-off linkages are remotely controlled through the centralized pushbutton control connected to the voltmeter coil of each switch.

Another advantage is that the voltmeter coil is connected in the very power supply circuit which it breaks by operating the trip-off linkages, thereby it will not be kept alive.

The apparatus of this invention also affords a better than halved consumption of cable conductors compared to those required to make up a lighting system according to the prior art. Further, this apparatus may be connected and controlled by a programming device to centrally deactivate the functions of the various electric appliances for set periods of time to save on power consumption.

I claim:

1. A remote control system for tripping off switches, of a type which comprises at least one double-pole switch, connected to and acting on an electrical appliance, having a central core supporting trip-off linkages, at least one input terminal electrically connected to a fixed contact and one output terminal electrically connected to a moving contact, a key for manually operating said trip-off linkages, a voltmeter coil housed within the central core for mechanically operating said trip-off linkages, having one end connected electrically to said moving contact and the other end serially connected by a diode to said output terminal, a power supply circuit for said coil equipped with a pushbutton control for energizing said coil and operating said trip-off linkages being connected with said moving contact in said power supply circuit.

2. An apparatus according to claim 1, wherein said switches are double-pole switches and characterized in that it comprises a diode connected serially to said voltmeter coil.

3. An apparatus according to claim 1, characterized in that said switches are single-pole switches and include a diode connected serially to said voltmeter coil 4. A system according to claim 1, wherein said switches are double-pole switches and connected in the single-plus-neutral pole mode to said electric appliance, characterized in that each said switch comprises a terminal attached to a frame supporting the voltmeter coil, said terminal being connected electrically to said pushbutton control and to one end of said coil.

5. A remote control system for tripping off switches of a type which comprises at least one double-pole switch, having a central core for supporting trip-off linkages and a voltmeter coil housed within said central core, being connected to and operative on an electric appliance, wherein said switch comprises a safety low-tension power supply circuit, structurally independent of said power supply circuit for said electric appliance, for energizing said coil, and moving contact of said switch in said circuit, said system further comprising a pushbutton control being connected to each coil in said low-tension power supply circuit.

6. An apparatus according to claim 5, characterized in that it comprises a pushbutton control connected to each coil in said low-tension power supply circuit.

7. A remote control system for tripping off switches, of a type which comprises at leat a first switch electrically connected to a second switch both provided with a central core supporting trip-off linkages, said first switch being connected to an electric appliance, wherein said second switch comprises a voltmeter coil housed within said central core, and a crank lever having a first arm affixed to said central core and extending in a position overlying said coil, and a second arm extending toward said first switch, said lever being operative on the trip-off linkages of both the first and second of said switches.

8. A system according to claim 7, characterized in that said coil is energized from a power supply circuit including a pushbutton control and a moving contact of one of said switches.

* * * * *